Oct. 18, 1966

MICHIO HIRATSUKA 3,279,247

SYSTEM AND APPARATUS FOR MEASURING
AND DETECTING MECHANICAL STRESS

Filed May 28, 1964

United States Patent Office 3,279,247
Patented Oct. 18, 1966

3,279,247
SYSTEM AND APPARATUS FOR MEASURING AND DETECTING MECHANICAL STRESS
Michio Hiratsuka, Yukuhashi-shi, Japan, assignor to Kabushiki Kaisha Yaskawa Denki Seisakusho, Kitakyushu-shi, Japan, a joint-stock company of Japan
Filed May 28, 1964, Ser. No. 370,766
Claims priority, application Japan, May 31, 1963, 38/28,461
5 Claims. (Cl. 73—141)

The present invention relates to improvements in systems and apparatus for electrically measuring and detecting a mechanical force.

Heretofore, for the purpose of measuring physical quantities such as weight, mechanical load, pressure and the like, it has been the most basic method to use a balance. This method, however, is effective only for the measurement of some physical quantity, and cannot be utilized for recording and controlling said quantity. As an effective system for avoiding the above-mentioned disadvantage, a system previously had been proposed in which movement of a balance beam is converted to an electrical quantity by means of a device such as a differential transformer or a resolver. This device is provided at an end of said balance beam, and the electrical quantity thus obtained is utilized for the remote measuring, indication, and recording, and is further employed as a sensing element for control. However, even in this system, since a balance is used as the basic element of the system, there are disadvantages in that the mechanism of the fulcrum becomes complicated and high precision is required, thus necessitating most careful conservation of said mechanism. Accordingly, this system is inadequate for the so-called ON-line balancer which is mostly used in various factories. A strain gauge and a device of the magnetostriction type have been recently used as detecting devices utilizing no balance mechanism since the principle of these devices is that the point to which a stress to be measured is applied is subjected to a strain so as to be moved by a required distance and this movement is applied for measuring said stress. However, a movement caused by the strain which is produced by a stress to be measured is indispensable, and if said movement is not sufficient, the measuring of said strain becomes very difficult. Furthermore, all systems utilizing a differential transformer, a strain gauge or a device of the magnetostriction type, have the disadvantage that, since the electric output taken out as the detecting quantity is extremely small, an amplifier having a high amplification factor is necessary in order to use said electric output for indication, recording, or controlling, thus limiting practical application of said systems.

It is an essential object of the present invention to provide an improved system capable of stably and precisely measuring and detecting mechanical stress without the above-mentioned disadvantages of the conventional systems.

It is another object of the present invention to provide an improved system capable of measuring and detecting a mechanical stress, which can be effectively used as a detecting device applicable to a wide range of measurements of weight, pressure, mechanical load, electric balance, and the like.

Said objects, other objects, and advantages of the present invention have been attained by a system, in which, to the iron core forming a magnetic path of a saturable reactor or a so-called magnetic amplifier, there is applied from the outside a force to be measured, thereby to impart a compression, tension, deflection, or bending to said iron core so as to vary the inclination of the intrinsic magnetic characteristic curve of said iron core, whereby the variation of said inclination is converted into a deviation voltage of an electric balanced circuit, and said force applied from outside is measured in response to said converted deviation voltage. In embodying this invention, two magnetic amplifiers which are exactly identical in their constructions are provided, and the permeabiilty of the iron core of one of said amplifiers is varied by applications of an outside force to said iron core, whereby a differential output of said amplifier is produced. Said output can be utilized to measure the force appled from the outside, irrespective of variations of temperature, voltage of the measuring power source, and frequency of the voltage, thus attaining effectively the desired objects.

With the foregoing objects and characteristic feature of this invention in view, the invention resides in the system as hereinafter more particularly described in connection with the accompanying drawings, in which like parts are designated by like reference characters, and in which.

Figure 1:
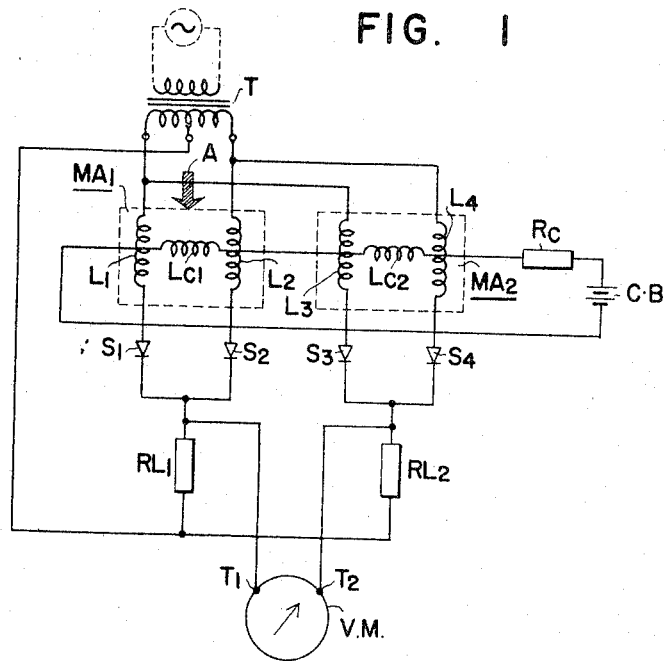
FIG. 1 is a circuit diagram indicating one example of the present invention.

Referring to the drawings, in FIG. 1 there is shown a circuit diagram of one example of the invention, said diagram indicating particularly the principle of the invention. The circuit of FIG. 1 comprises two magnetic amplifiers (or saturable reactors) MA1 and MA2 having exactly the same electrical and magnetical characteristics and comprising, respectively, main exciting coils ($L_1$, $L_2$), ($L_3$, $L_4$), and control coils $L_{c1}$ and $L_{c2}$, said amplifiers being utilized respectively as an active element and a dummy element; unidirectional rectifiers $S_1$, $S_2$, $S_3$ and $S_4$; output resistors $RL_1$ and $RL_2$; an adjusting resistor $R_c$ for adjusting the control current; a transformer T having a central tap; a local D.C. power source C.B for supplying control current; a detecting meter V.M for indicating the detected quantity; and terminals $T_1$ and $T_2$. In the circuit of FIG. 1, a force applied from the outside is represented by the character A.

In the circuit of FIG. 1, when a force A is applied from outside to the magnetic amplifier MA1, a difference between the outputs of the magnetic amplifiers MA1 and MA2 corresponding to a strain caused by said applied force appears at the terminals $T_1$ and $T_2$, whereby said strain can be indicated at the meter V.M, thus enabling measurement of the force A.

The operation of the circuit of FIG. 1 will be described in detail hereinbelow.

Figure 2:
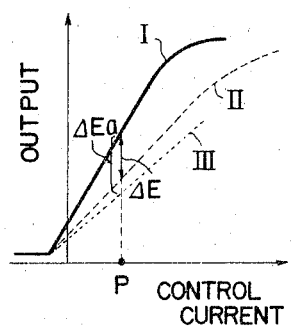
FIG. 2 is a characteristic curve indicating output power which varies in response to force applied from the outside in this invention.

In FIG. 2 indicating output characteristic curves of the magnetic amplifiers MA1 and MA2, a control current flowing through the control coils and electric outputs of the magnetic amplifiers are respectively plotted as abscissa and ordinate. The curve I indicates the output characteristic of each of the magnetic amplifiers MA1 and MA2 in the case of no application of an outside force to said amplifiers. The curve II indicates the output characteristic in the case when an outside force is applied to only the magnetic amplifier MA1. When the control current flowing through the control coils is adjusted so as to be a value P by means of the local power source C.B and the adjusting resistor $R_c$, and the output of the magnetic amplifier MA1 is deviated so as to correspond to the characteristic curve II by application of a force A thereto, an output difference $\Delta E$ between the outputs of the magnetic amplifiers MA2 and MA1 is introduced into the meter V.M as an electrical detecting input. This difference $\Delta E$ is in proportion to the magnitude of the outside force A and becomes $\Delta Ea$ in the case when the output characteristic curve of the magnetic amplifier MA1 is made to correspond to the curve III. The value P of the control current is generally adapted to correspond to a stable and sensitive operation point.

Figure 3:
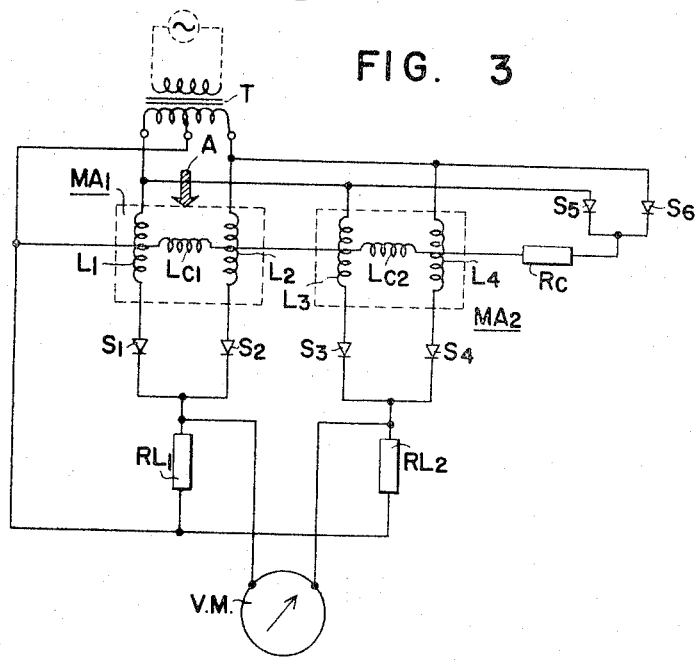
FIG. 3 is a circuit diagram indicating another example of the present invention.

The example of FIG. 3 is almost the same as the example of FIG. 1 except that the local power for energizing the control coil is directly supplied from the transformer T, which is a main power source, and there are provided two more unidirectional rectifying elements $S_5$ and $S_6$ which are connected at their anode sides to the two terminals of the secondary side of the transformer T and at their other sides to the central tap of the transformer T through the adjusting resistor $R_c$ and the control coils $LC_2$ and $LC_1$.

The numerical data of the example of FIG. 3 are, for instance, as indicated hereinbelow.

| | | |
|---|---|---|
| Force A | 300 kg | 100 kg. |
| Transformer T: | | |
| Primary voltage | A.C., 100 v | A.C., 100 v. |
| Secondary voltage | A.C., 25 v | A.C., 8 v. |
| Frequency | 50 cycle, 60 cycle | 50 cycle, 60 cycle. |
| Number turns of coil windings: | | |
| $L_1, L_2, L_3, L_4$ | Each 1,400 | Each 1,400. |
| $LC_1, LC_2$ | Each 500 | Each 500. |
| Unidirectional rectifying elements: $S_1, S_2, S_3, S_4, S_5, S_6$ | Silicon diode | Silicon diode. |
| Resistance values: | | |
| $RL_1, RL_2$ | Each 200Ω | Each 50Ω. |
| $R_c$ | 1,000Ω | 400Ω. |
| Meter V.M | Voltmeter for 3 volt. | Voltmeter for 1 volt. |

Figure 4:
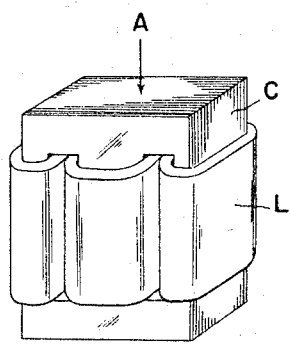
FIGS. 4 and 5 are perspective views indicating constructions of a transformer to be used in this invention.

In FIG. 4 there are shown the essential parts of the magnetic amplifier MA1, in which the characters C, L, and A indicate, respectively, an iron core forming a magnetic path constructed by lamination of silicon steel sheets, operation coil and control coil, and an outside force, the arrow indicating the application direction of the force A.

Figure 5:
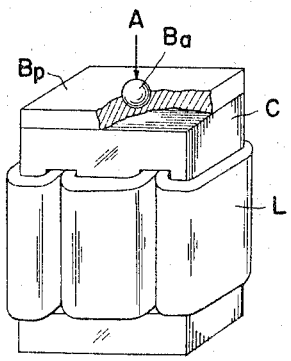

FIG. 5 shows a practical manner of applying an outside force to the magnetic amplifier of FIG. 4. That is, a stainless steel ball $B_a$ having magnetically insulating character is put in a hole provided on a plate $B_p$ which is attached onto the iron core C. According to this construction, the member applying an outside force to the apparatus can be magnetically separated from the essential parts of the apparatus. Instead of using said stainless steel ball $B_a$, a stainless steel hook attached upright to the plate $B_p$, said hook being made to be pulled by an outside force to be measured so that the iron core C is contracted or stretched by the pull on said hook, may be effectively used to measure an outside tensile stress.

Briefly, the characteristic feature of this invention is that the inclination $\mu = B/H$ (where, H, B, and $\mu$ represent, respectively, magnetic field intensity, magnetic density, and magnetic permeability) of the magnetisation characteristic of the iron core, that is, the permeability $\mu$, is varied by application of an outside force to be measured, and a control current is applied to a point in the straight part of said characteristic curve, corresponding to a valve which is the most easily detected as the electric energy, whereby an electric deviation $\Delta E$ caused by the force A can be measured. When the force A is applied to the ball $B_a$ toward the arrow direction, the permeability $\mu$ of the iron core C is varied, whereby the magnetic flux of the iron core C is varied. This variation of the magnetic flux produces the same effect as that obtainable by passing an electric current through the control coil of the conventional magnetic amplifier, whereby a variation of an electric output is obtained. In this case, the mechanical strength of the iron core C is adjusted in accordance with the magnitude of the force A so that the applied pressure is in proportion to the magnitude of the output variation of the magnetic amplifier within the range of the elastic limit of the iron core.

In the above-mentioned examples, the magnetic amplifier MA2 is provided, but this amplifier is not indispensable provided that the meter V.M can read out the deviation in the electric output of the magnetic amplifier MA1.

In the examples of FIGS. 1 and 3, the magnetic amplifiers MA1 and MA2 are connected so that their outputs have reverse polarities. According to such connection of the magnetic amplifiers MA1 and MA2, various unfavorable effects due to boundary conditions such as temperature variation, voltage fluctuation, and the like can be mutually counterbalanced, whereby stable and accurate measurement is attained. However, in the practical measurement of a weight or a mechanical load, it is, of course, necessary to provide suitable auxiliary devices capable of applying the above-mentioned physical quantities such as temperature variation, voltage fluctuation and the like, to the iron core in the state of a pressure.

Advantages of this invention will be described in detail hereinbelow.

According to this invention, a pressure is applied from the outside to the iron core of a saturable reactor or a magnetic amplifier so as to vary the permeability of said iron core and, accordingly, the magnetic flux passing through said iron core; this variation of the magnetic flux is amplified by the amplifying action of a detector device itself; and this amplified variation is taken out as an electric output, so that the detection of the detecting element is far superior to that of the conventional system. For example, it has been found possible to obtain a high precision which is $10^5$ times that of a strain gauge or $10^2$ times that of the pressure detecting apparatus in which a variation of the magnetic flux caused by a mechanical stress is converted to a variation of mutual inductance between an exciting coil and a detecting coil. Accordingly, according to this invention, a large movement due to a mechanical strain is not necessary, and direct indication or recording can be attained without providing any amplifier in the case of normal use. Furthermore, since the system itself has an amplification function, it becomes possible to measure a minor pressure or weight, the measurement of which has been impossible by the conventional systems, and since the system according to this invention has no delicate device or mechanism, the system can be widely utilized in various factories and other fields.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

I claim:

1. An apparatus for measuring and detecting a mechanical stress which comprises saturable reactors having respective iron cores; means for applying a force from the outside to said iron cores thereby causing a variation of the electric output of said reactors; a stainless steel ball interposed at the position where said outside force is applied thereby magnetically insulating said outside force from the apparatus; and detecting means for taking out an electric quantity in response to the variation of the magnetic flux passing through said iron cores, said variation of magnetic flux being caused by the force applied from the outside.

2. An apparatus for measuring and detecting a mechanical stress which comprises saturable reactors having respective iron cores; means for applying a tensile stress from the outside to said iron cores thereby causing a variation of the electric output of said reactors; a stainless steel hook interposed at the position where said tensile stress is applied from the outside thereby magnetically insulating said outside stress from the apparatus; and detecting means for taking out an electric quantity in response to the variation in magnetic flux passing through said iron cores, said variation of magnetic flux being caused by the stress applied from the outside.

3. An apparatus for measuring and detecting a mechanical stress which comprises magnetic amplifiers having respective iron cores; means for applying a force from the outside to said iron cores thereby causing a variation of the electric output of said amplifiers; a stainless steel ball interposed at the position where said outside force is applied thereby magnetically insulating said outside force from the apparatus; and detecting means for taking out an electric quantity in response to the variation of the magnetic flux passing through said iron cores, said variation of magnetic flux being caused by the force applied from the outside.

4. An apparatus for measuring and detecting a mechanical stress which comprises magnetic amplifiers having respective iron cores; means for applying a tensile stress from the outside to said iron cores thereby causing a variation of the electric output of said amplifiers; a stainless steel hook interposed at the position where said tensile stress is applied from the outside thereby magnetically insulating said outside stress from the apparatus; and detecting means for taking out an electric quantity in response to the variation of magnetic flux passing through said iron cores, said variation of magnetic flux being caused by the stress applied from the outside.

5. An apparatus for measuring a mechanical stress such as weight, pressure, mechanical load and the like, comprising a pair of magnetic amplifiers, each including a magnetic core, a pair of A.C. coils and a control winding wound about said core; an A.C. source; said pair of coils being connected to opposite terminals of said A.C. source; means for applying said stress to the core of one of said amplifiers; means for energizing said control windings in series by a constant direct current in a range varying the permeability of said core in proportion to the magnitude of said stress thereby producing an amplified electrical output in the A.C. coils associated with the core subjected to said stress; and means responsive to the difference between the outputs of the A.C. coils in said pair of magnetic amplifiers.

References Cited by the Examiner
UNITED STATES PATENTS

| 2,548,049 | 4/1951 | Olson | 330—8 |
|---|---|---|---|
| 3,168,830 | 2/1965 | Chass | 73—517 X |

LOUIS R. PRINCE, *Primary Examiner.*

M. B. HEPPS, *Assistant Examiner.*